United States Patent [19]

Yamashita

[11] 4,044,390

[45] Aug. 23, 1977

[54] CARTRIDGE LOADING AND UNLOADING DEVICE USE IN CARTRIDGE TYPE TAPE RECORDERS

[75] Inventor: Masakazu Yamashita, Iwaki, Japan

[73] Assignee: Motorola, Inc., Schaumburg, Ill.

[21] Appl. No.: 613,713

[22] Filed: Sept. 15, 1975

[30] Foreign Application Priority Data

Sept. 26, 1974 Japan .................................. 49-116024

[51] Int. Cl.² ........................ G11B 25/06; G11B 23/04
[52] U.S. Cl. ......................................... 360/93; 360/137
[58] Field of Search ...................... 360/93, 92, 137, 96; 242/194, 55.19 A

[56] References Cited

U.S. PATENT DOCUMENTS

| | | | |
|---|---|---|---|
| 3,633,922 | 1/1972 | Yokota | 360/137 |
| 3,726,456 | 4/1973 | Church et al. | 360/93 |
| 3,864,050 | 2/1975 | Thomas | 360/93 |
| 3,867,720 | 2/1975 | Tanaka | 360/93 |
| 3,867,721 | 2/1975 | Saunders | 360/93 |
| 3,955,216 | 5/1976 | Fujita | 360/137 |

Primary Examiner—Alfred H. Eddleman
Attorney, Agent, or Firm—Phillip Melamed; James W. Gillman; Donald J. Lisa

[57] ABSTRACT

A simplified and easily constructed device for loading and unloading a tape cartridge is disclosed. The device consists of a rotary member rotatably mounted on a chassis. The rotary member has a holder portion positioned for selectively engaging and disengaging a V-shaped notch in a tape cartridge in association with the rotational motion of the rotary member. The rotary member also has a responder portion positioned for being engaged by a cartridge upon insertion and rotating the holder portion into the V-shaped notch. A floating pin and a spring for biasing the pin into contact with a recess in the rotary member are used to restrain the rotational movement of the rotary member and assure a positive loading and unloading of the cartridge.

9 Claims, 4 Drawing Figures

CARTRIDGE LOADING AND UNLOADING DEVICE USE IN CARTRIDGE TYPE TAPE RECORDERS

BACKGROUND OF THE INVENTION

1. Field of the Invention

The present invention is related to the field of cartridge loading and unloading devices for a cartridge type tape recorder. More particularly, the present invention is related to such devices which simply and securely position a tape cartridge within the loading passage of a tape recorder for the purposes of either recording sound on a magnetic tape or monitoring a performance previously recorded on a magnetic tape.

2. Description of the Prior Art

The prior art cartridge loading and unloading devices generally consist of a C- shaped lever which is rotatably mounted on the underside of a chassis beneath the cartridge retaining passage of the tape recorder. The C-shaped lever is initially rotated by having the front surface of the inserted cartridge engage a lever which results in the actuation of an overcenter spring such that the C-shaped lever is rotated and a holder portion of the lever is brought into contact with a V-shaped notch in the cartridge. Thus the insertion of the cartridge locates and locks the cartridge into a predetermined position. One such prior art device is described in U.S. Pat. No. 3,485,500. These prior art devices are difficult to use in miniaturized (thin) tape recorders because the underside of the chassis must be provided with raised portions to prevent the excessive rotation of the C-shaped lever. In addition, these prior art devices are relatively complex and may require several stop members to prevent the excessive rotation of the C-shaped lever.

SUMMARY OF THE INVENTION

An object of the present invention is to provide an improved cartridge loading and unloading device which overcomes the aforementioned deficiencies.

A more specific object of the present invention is to provide an improved cartridge loading and unloading device which has a simplified construction and can be laterally mounted alongside the cartridge retaining passage of a tape player.

An addition object of the present invention is to provide an improved cartridge loading and unloading device in which a floating pin prevents the excessive rotation of a rotary member which generally controls the positioning of an inserted cartridge.

In one embodiment of the present invention there is provided an improved cartridge loading and unloading device for use in a cartridge type tape recorder in which a cartridge is located in an operational position by having a holder engage a V-shaped notch in the cartridge. The improved loading and unloading device includes a rotary member rotatably attached to a chassis and provided with a holder portion and a responder portion. The holder portion is positioned for selectively engaging and disengaging the V-shaped notch in a cartridge in association with the rotational movement of the rotary member. The responder portion is positioned for engaging the front portion of the cartridge upon the insertion thereof and thereby rotating the holder portion into the V-shaped notch. A floating pin positioned movable to the chassis and a spring for urging the pin against the rotary member are also provided. The rotary member has at least one recess formed therein for selectively engaging the pin in response to the operation of loading and unloading the cartridge, whereby the pin aids in restraining the rotational motion of the rotary body. An additional spring is used to normally urge the rotation of the rotary member in a predetermined direction.

BRIEF DESCRIPTION OF THE DRAWINGS

For a more complete understanding of the present invention reference should be made to the drawings, in which.

DESCRIPTION OF THE PREFERRED EMBODIMENT

Figure 1:
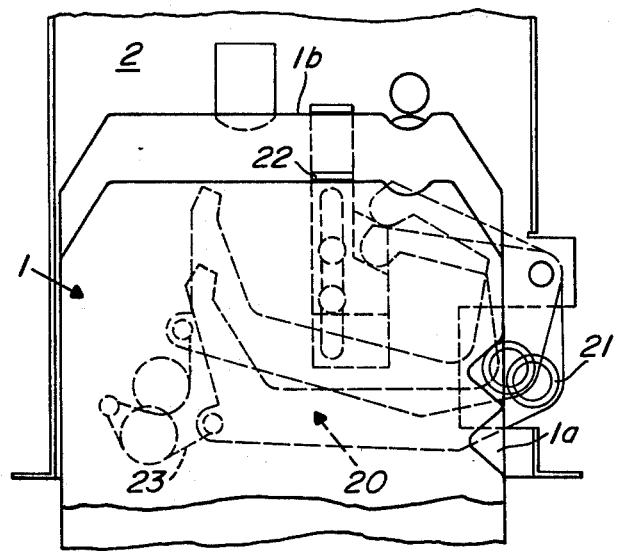
FIG. 1 is a plane view generally showing a prior art cartridge loading and unloading device.

FIG. 1 illustrates a prior art loading and unloading device in which a C shape lever 20, having a holder portion 21 positioned for engagement with a V-shaped notch 1a formed in a cartridge 1, is rotatably mounted on the underside of a chassis 2. When the cartridge 1 is loaded, the C-shaped lever 20 is biased by means of a lever 22 which is pushed in by a front surface 1b of the cartridge. The result is that an overcenter spring 23 is reversed beyond its dead center position and causes the holder portion 21 to engage the V-shaped notch 1a, thus locating the cartridge 1 in position. Both the loaded and unloaded positions of the cartridge are shown superimposed upon each other in FIG. 1. A more detailed description of the operation of this prior type device can be found in U.S. Pat. No. 3,486,500, and the present FIG. 1 is intended merely to generally illustrate the operation of the prior cartridge loading and unloading devices.

Figure 2:
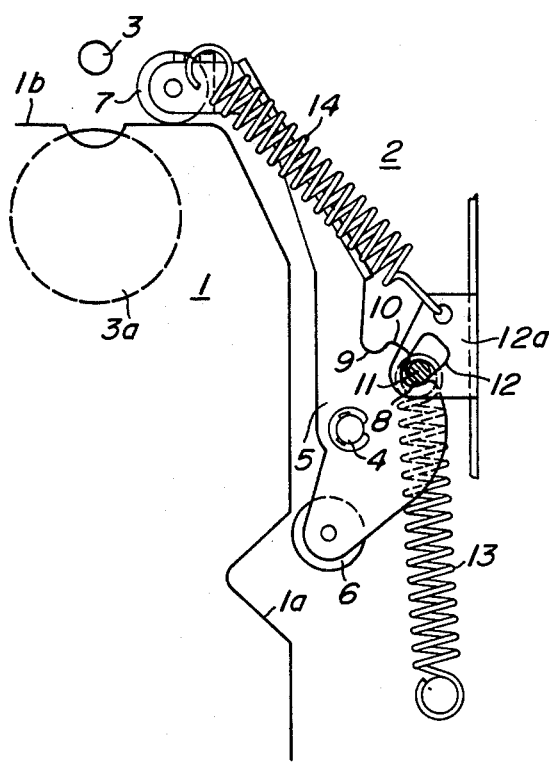
FIG. 2 is a simplified plane view of a cartridge loading and unloading device constructed in accordance with the present invention and illustrated just prior to the loading of a cartridge.

Referring now to FIG. 2, a preferred embodiment of the present invention is illustrated just prior to the loading of a cartridge 1 into a cartridge type tape player. The cartridge 1 is guided by a guide pole (not shown) mounted on a supporting chassis generally indicated by the reference number 2. The cartridge 1 will be loaded into a cartridge inserting passage and the tape of the cartridge will come into contact with a capstan shaft 3 and be maintained in contact therewith by a cartridge roller 3a.

A rotary member 5 is rotatably mounted to the chassis 2 through a pin 4 and the rotary member is positioned adjacent to the cartridge inserting passage. The rotary member has one end thereof provided with a holder portion 6, consisting of a roller in the preferred embodiment, which is positioned for engagement with a V shaped notch 1a in the cartridge 1. The rotary member 5 has another end thereof provided with a responder portion 7, also a roller in the preferred embodiment, which is positioned for engaging a front surface 1b of the cartridge 1 when the cartridge is loaded. The engagement of the responder 7 by the surface 1b results in the rotation of the rotary member 5. The responder portion 7 is always extended into the cartridge inserting passage when the cartridge is not loaded and therefore is always engaged by the front surface 1b of the cartridge during insertion.

The rotary member 5 has first and second recesses 8 and 9, respectively, formed on a side thereof which is not facing the cartridge loading passage. A cam portion 10 is formed between the recesses. A floating pin 11 is movably mounted within a guide slot 12 in a bracket arm 12a mounted to the chassis 2. The pin 11 is always urged against the rotary member 5 by a spring 13 coupled between the pin 11 and the chassis 2. In the preferred embodiment, the pin 11 is always urged toward the open end of the cartridge inserting passage.

When the cartridge 1 is not loaded, the first recess 8 formed in the rotary member 5 is engaged by the pin 11 to restrain the rotation of the rotary member 5. An axilliary spring 14 is coupled between the responder portion 7 and the bracket 12a to assist the rotary member 5 in smoothly and easily rotating when the responder portion 7 is engaged by a cartridge.

Figure 3:
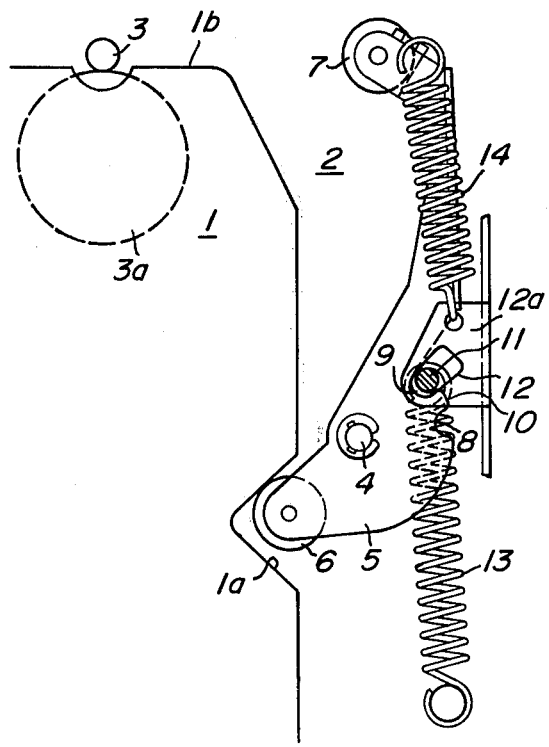
FIG. 3 is a simplified plane view of the loading and unloading device illustrated in FIG. 2 just after the loading of a cartridge.

When the cartridge 1 is loaded into the inserting passage, the front surface 1b of the cartridge comes into contact with the responder portion 7 of the rotary member 5. As the cartridge 1 is further inserted, the cartridge bears against the responder portion and rotates the rotary member 5 clockwise about the pin 4. This causes the holder portion 6 to engage the V-shaped notch 1a in the cartridge 1 to locate the cartridge in the proper position. The position of the rotary member 5 after the total insertion of the cartridge 1 is illustrated in FIG. 3.

Figure 4:
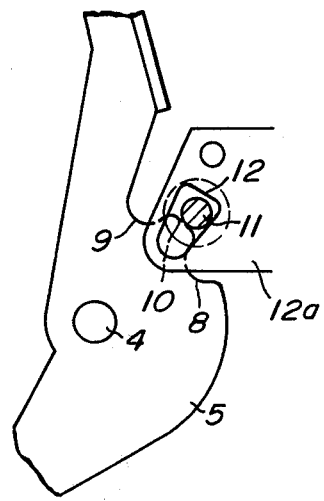
FIG. 4 is an enlarged plane view illustrating a portion of the cartridge loading and unloading device shown in FIGS. 1 and 2.

During the rotation of the rotary member 5, the pin 11 is continuously urged against the rotary member by the spring 13. The pin 11, initially in the first recess 8 of the rotary member 5, moves along the guide slot 12, is disengaged from the first recess 8, slides along the cam portion 10 (as generally shown in FIG. 4), and comes into engagement with the second recess 9 (see FIG. 3). In this manner, the cartridge 1 is loaded into a tape cartridge recorder.

The rotational force contributed to the rotary member 5 by the axilliary spring 14 is insufficient to disengage the pin 11 from the recess 8 until an additional rotational force is supplied by the engaging of the responder portion 7 by the surface 1b of the cartridge. Thus the pin 11 prevents the rotational motion of the rotary member 5 by the spring 14 until an additional rotary force is supplied by the insertion of a cartridge. Once this additional initial insertion force is supplied, the spring 14 then aids in rotating the rotary member 5 and also provides a rotational force to the rotary member which forces the holder portion 6 into engagement with the notch 1a and thereby positions the cartridge roller 3a against the capstan shaft 3.

Excessive rotation of the rotary member 5 after a cartridge is inserted is prevented by the pin 11 being engaged in the recess 9 and the holder portion 9 forcing the cartridge 1 against the capstan shaft 3.

When the cartridge 1 is unloaded from a cartridge tape recorder, the V-shaped notch 1a bears against the holder portion 6 and rotates the rotary member 5 in a counter-clockwise direction thereby disengaging the pin 11 from the recess 9, sliding the pin along the cam portion 10, and reengaging the pin in the first recess 8. The engagement of the pin in the recess 8 also prevents any excess counter-clockwise rotation of the rotary member 5.

As is evident from the foregoing explanation, the present invention provides a cartridge loading and unloading device which has a simplified construction and can be laterally mounted along side the cartridge insertion passage. The present invention therefore provides an improved loading and unloading device which can be adapted to provide a miniaturized tape player. Also the simplified construction of the inventive device provides a reliable and economical cartridge loading and unloading device.

The present invention has therefore provided, by means of a pin engaging a first or second recess in a rotary member, a simplifier cartridge loading device which efficiently positions a cartridge in a cartridge inserting passage provides a sufficient holding force between the capstan shaft of a tape player and the pinch roller of a cartridge.

The aforementioned preferred embodiment of the invention has been described as having a rotary member with two recesses formed therein. However, a rotary member designed with only one recess so that the pin is disengaged from this recess when a cartridge is loaded is within the scope of the present invention.

While I have shown and described specific embodiments of this invention, further modifications and improvements will occur to those skilled in the art. All such modifications which retain the basic underlying principles disclosed and claimed herein are within the scope of this invention.

I claim:

1. In a cartridge type tape recorder in which a cartridge is located in an operational position by having a holder engage a V-shaped notch in the cartridge, and improved cartridge loading and unloading device comprising:

a rotary member rotatably attached to a chassis and provided with a holder means and a responder means, said holder means and said responder means integrally rotatable with said rotary member and said holder means positioned for selectively engaging and disengaging a V-shaped notch in a cartridge in association with the rotational motion of said rotary member, said responder means positioned for engaging a portion of the cartridge upon the insertion thereof and rotating said rotary member;

a floating pin disposed movable relative to the chassis; and spring means for urging said pin against said rotary member;

said rotary member having at least one recess formed therein for selectively engaging said pin in response to the operation of loading and unloading the cartridge, wherein said pin and said recess restrain the rotational motion of said rotary body and provide a predetermined rotary position for said rotary body, said responder means and said holder means.

2. An improved cartridge loading and unloading device according to claim 1 which includes a member that has a slot, said pin being movably positioned in said slot.

3. An improved cartridge loading and unloading device according to claim 2 wherein said rotary member includes two recesses, said pin being alternately positioned in each of said recesses in response to the loading and unloading of a cartridge.

4. An improved cartridge loading and unloading device according to claim 3 which includes second spring means coupled to said rotary body for urging the rotation of said rotary member in a predetermined direction.

5. An improved cartridge loading and unloading device according to claim 4 wherein said second spring means is connected to said responder means.

6. An improved cartridge loading and unloading device according to claim 5 wherein said holder means and said responder means each include at least one roller member.

7. An improved cartridge loading and unloading device according to claim 1 wherein said floating pin is disposed movable relative to said rotary member.

8. An improved cartridge loading and unloading device according to claim 7 which includes a stationary member mounted to the chassis, said stationary member having a slot and said pin being movably positioned in said slot.

9. An improved cartridge load and unloading device according to claim 9 where said floating pin is mounted movable with respect to said chassis in any direction.

* * * * *

UNITED STATES PATENT AND TRADEMARK OFFICE
CERTIFICATE OF CORRECTION

PATENT NO. : 4,044,390
DATED : AUGUST 23, 1977
INVENTOR(S) : MASAKAZU YAMASHITA

It is certified that error appears in the above-identified patent and that said Letters Patent are hereby corrected as shown below:

After the colon following the word assignee in item [73] on the cover page of the patent:

Please delete "Motorola, Inc., Schaumburg, Illinois" and insert --ALPS Motorola, Inc., Tokyo, Japan.

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*